Jan. 13, 1970 C. E. MACON ET AL 3,490,006

INSTRUCTION STORAGE AND RETRIEVAL APPARATUS FOR CYCLICAL STORAGE MEANS

Filed June 19, 1967 3 Sheets-Sheet 1

INVENTORS.
CHARLES E. MACON
ROBERT S. BARTON
PAUL A. QUANTZ
GEORGE T. SHIMABUKURO

BY Christie, Parker & Hale
ATTORNEYS.

INVENTORS.
CHARLES E. MACON
ROBERT S. BARTON
PAUL A. QUANTZ
GEORGE T. SHIMABUKURO
BY Christie, Parker & Hale
ATTORNEYS.

INVENTORS
CHARLES E. MACON
ROBERT S. BARTON
PAUL A. QUANTZ
GEORGE T. SHIMABUKURO
BY Christie, Parker & Hale
ATTORNEYS.

3,490,006
INSTRUCTION STORAGE AND RETRIEVAL APPARATUS FOR CYCLICAL STORAGE MEANS

Charles E. Macon, Arcadia, Calif., Robert S. Barton, Salt Lake City, Utah, Paul A. Quantz, Scottsdale, Ariz., and George T. Shimabukuro, Monterey Park, Calif., assignors to Burroughs Corporation, Detroit, Mich., a corporation of Michigan Filed June 19, 1967, Ser. No. 646,923
Int. Cl. G11b *13/00;* G06f *1/00, 7/00*
U.S. Cl. 340—172.5 17 Claims

ABSTRACT OF THE DISCLOSURE

A data processing system having a digital data processor, a disk file storage system for storing program instructions and data and an electronic program analyzer for providing instructions to the disk file storage system and the data processor. The storage system includes a magnetic core memory system for storing instructions identifynig reading and writing operations at designated locations on disk and for making such instructions available, one at a time, as the desired location on disk for such instruction becomes available for reading and writing.

CROSS REFERENCE TO RELATED APPLICATIONS

The present invention is directed to the memory system for storing the instructions for the disk file separately and in combination with the associated data processing system. A copending patent application entitled "Data Processing System Having Instruction Conversion Apparatus" filed on the same date as this application and given Ser. No. 646,953, is directed to the program analyzer separately and in combination with the associated data processing system disclosed in the present application. Another copending patent application entitled "Multi-Program Data Processor," given Ser. No. 646,986, is directed to the instruction queue disclosed in the present patent application.

BACKGROUND OF INVENTION

The present invention relates to digital data processing systems and more particularly to data processing systems employing improved storage apparatus therefor.

Data processing systems are known which utilize auxiliary storage systems. Many modern data processing systems utilize a disk file as the auxiliary storage system. Many improvements have been made in disk file storage systems so that information can be read and written therein at a very high speed. One significant improvement in a disk file is the provision of a read and write head for each track on a disk.

As the transfer rate at which information can be read and written in disk files is increased, problems arise in providing disk file instructions (for control of reading and writing) to the disk file in an efficient manner so as to take advantage of the higher speed capabilities of the disk file. Accordingly, systems have been devised whereby the disk file instructions are stored in a memory associated with the disk file and the memory is arranged so that the disk file instructions can be read out thereof and made available for controlling the operation of the disk file in advance of the time the desired location on a disk becomes available for reading and writing. For example, if an instruction states that information is to be read out of a certain track at a certain angular position (or sector), such instruction is stored in the memory associated with the disk file and is read out just prior to the time the desired angular position becomes available for accessing. The instruction is then used to read out the desired track of the available sector.

Elaborate systems have been devised for storing the instructions and making them available for accessing the disk file. One such memory system employs an associative memory and an address counter that provides an address corresponding to each angular position of the disk. Each address is used to address the content of the associative memory and pick out an instruction containing such address in advance of the time the corresponding angular position becomes available for reading and writing. In another memory system for storing disk file instructions, a cyclical type of memory is used in which all of the instructions are read out as each angular position of the disk becomes available for addressing. The instructions are compared against an address counter and when a predetermined relationship is detected between the address formed by the counter and the address in a particular instruction, such instruction is selected and used to control the disk file.

There are certain disadvantages of the above-mentioned prior art systems. For example, the memory systems are quite complicated and expensive. Also as the rate at which information can be transferred from the disk file is increased, it becomes more difficult to store and read out the disk file instructions at a high enough speed to utilize the higher transfer rates of which the disk file is capable.

Yet another disadvantage is that many disk instructions can be stored in the memory for reading and writing at one angular position of a disk. This can result in a lack of memory space for instructions which would cause reading and writing at other angular positions of the disk. As a result, the instructions which can not be stored in the memory must be retained until memory space is available. This results in inefficient use of accesses to the disk file.

SUMMARY OF THE INVENTION

In contrast to the prior art, an embodiment of the present invention utilizes a memory that has one memory location for each angular position or sector on the disk. A disk instruction is stored in each memory location in the memory location corresponding to the angular position or sector it is desired to access. The content of each memory location is read out in synchronism with the rotation of the disk as the corresponding angular position becomes available for reading and writing.

One advantage of an embodiment of the present invention is that it is only necessary to have one memory location for each addressable angular position on a disk. Another advantage is that a conventional memory may be used for storing the instructions. Still another advantage is that the cost of the memory system can be significantly reduced. Still another feature is that the speed with which instructions are obtained from the memory can be increased.

Another very important advantage is that the memory system will always access each angular position of a disk as it becomes available whenever there is an instruction for such position, even though there may be large numbers of instructions waiting to cause access to one particular angular position.

Briefly, storage apparatus embodying the present invention includes a cyclical storage means having cyclically accessible storage positions therein including means for reading and writing therein in response to instructions. Adderssing means is provided for forming a unique address for each different storage position as it becomes available for accessing. A memory is provided having a memory location for each storage position of the cyclical storage means for storing an instruction. The memory is coupled to the addressing means and includes means for reading out the instruction contained in each memory location as the corresponding address is formed. The instructions are coupled to the cyclical storage means causing an access to each storage position for which there is an instruction in the corresponding memory location.

These and other aspects of the present invention may be more fully understood with reference to the following deescription of an embodiment of the present invention.

DESCRIPTION OF THE PREFERRED EMBODIMENT

Figure 1:
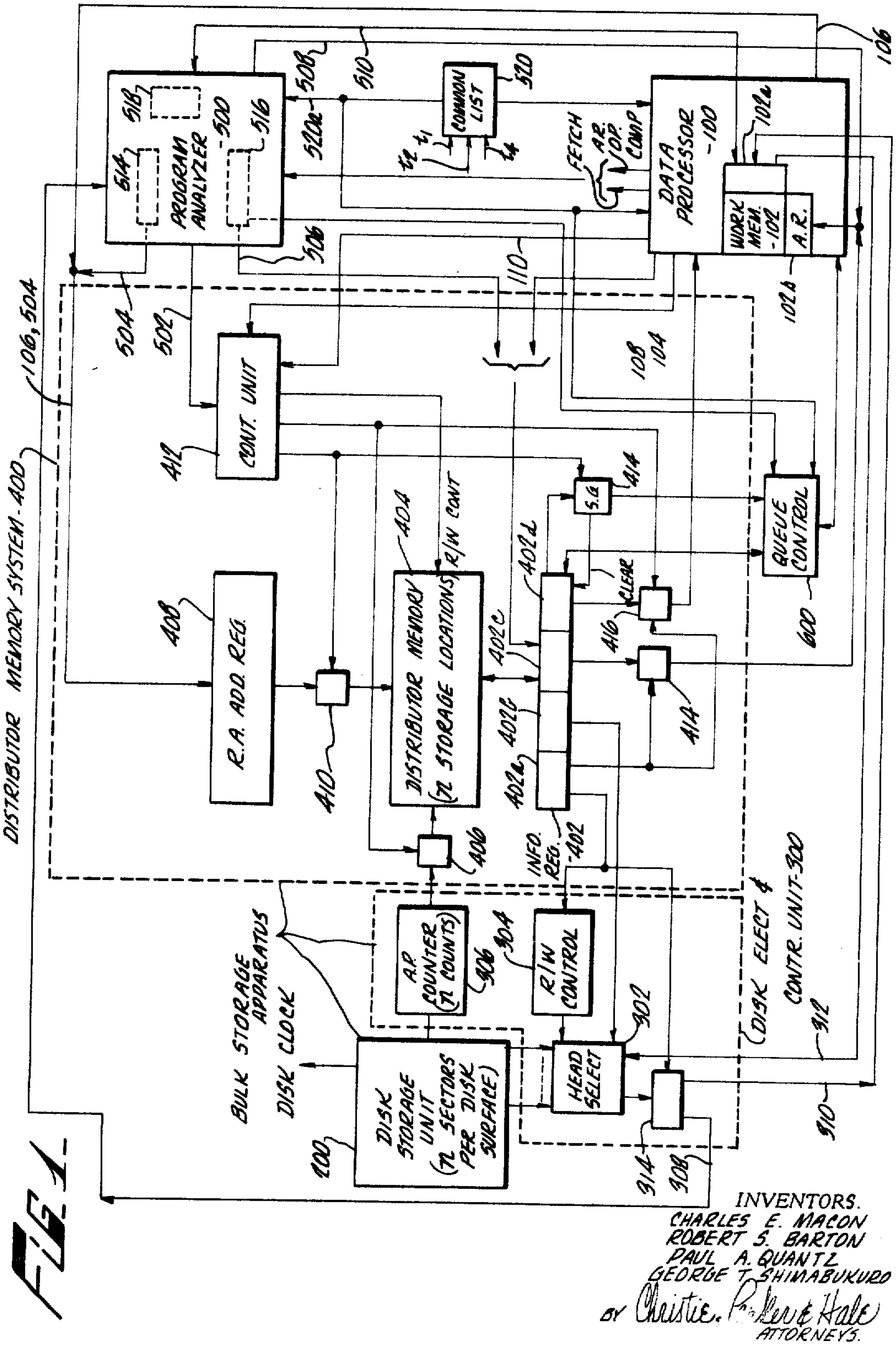
FIG. 1 is a block diagram of a data processing system and embodies the present invention.

Refer now to the block diagram of FIG. 1. A data processor 100 includes a working memory 102. Information, including data to be processed and program to be executed, are stored on a disk in a disk storage unit 200. The program is made up of what are called "primary instructions." Portions of the data are transferred from the disk storage unit 200 to the working memory 102 in advance of the time needed for operation by the data processor 100. A disk electronic and control unit 300 contains the circuitry for selecting heads in the disk storage unit 200 and for reading and writing on the disk of the disk storage unit 200. The disk electronic and control unit 300 operates under control of what are called "disk file instructions." The disk file instructions are stored in a distributor memory system 400. The disk storage unit 200, the electronic and control unit 300 and the distributor memory system 400 together form an auxiliary bulk storage apparatus for the data processor 100.

The operation of the distributor memory system 400 in combination with the disk storage unit 200 and the electronic and control unit 300 is of considerable importance. Briefly, the distributor memory 400 has a memory with a memory storage location for each sector on a disk in the disk storage unit 200. Each memory location stores an instruction for control of reading and writing in the corresponding sector of the disk. The disk electronic and control unit 300 provides a unique address signal corresponding to each sector as it becomes available for reading and writing. The distributor memory system 400 automatically reads out the instruction in a storage location as the coresponding sector becomes available on disk for reading and writing and as the corresponding address is formed by the disk electronic and control unit 300. The instruction is applied to the disk electronic and control unit 300 causing reading and writing in the corresponding sector of the disk as it becomes available. If no instruction is stored in a particular memory location of the distributor memory 400 no reading or writing operation takes place when this memory location is read. The information read and written in this manner in the disk storage unit 200 includes the program instructions, data and results of arithmetic operations by the data processor 100.

A program analyzer 500 receives the "primary instructions" from the disk storage unit 200 and converts each primary instruction into one or more instructions of two different types. The first type of instruction is called the "disk file instruction." The disk file instructions are sent to the distributor memory system 400 by the program analyzer 500 where they are used to cause the disk electronic and control unit 300 to read or write in the disk storage unit 200 and for control of the transfer of information between the disk storage unit 200 and the data processor 100 and the program analyzer 500.

The second type of instruction which is formed by the program analyzer is called a "data processor instruction," and is sent to the data processor 100 for controlling the operation of the data processor 100.

Figure 2:
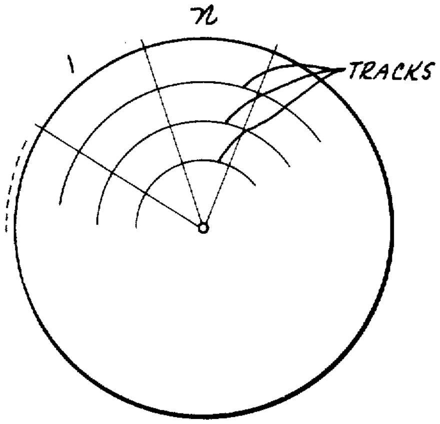
FIG. 2 is a sketch illustrating the layout of information on the disk used in the system of FIG. 1.

The disk storage unit 200 is a conventional disk file and may have one or more revolving disks having magnectic recording surfaces thereon. Although the disk storage unit 200 may have many disks therein, it is assumed, for purposes of explanation, that there is only one disk. FIG. 2 is a sketch illustrating the layout of information on the disk contained in the disk storage unit 200. The disk contains a plurality of recording tracks on the magnetic recording surface and the tracks are divided into *n* sectors. Each storage location on the disk is defined by a track number (TR) and angular position (AP) corresponding to one of the *n* sectors.

Figure 3:
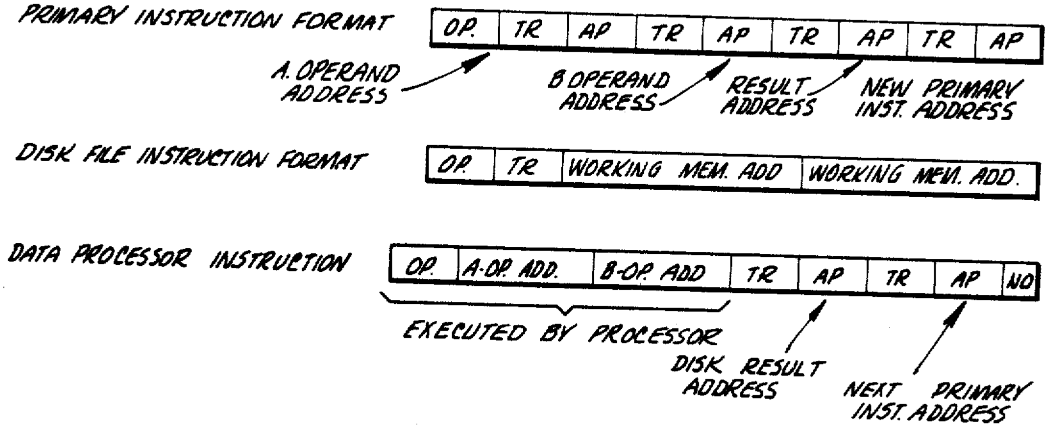
FIG. 3 is an example of instruction formats used in the data processing system of FIG. 1.

Additionally, the disk storage unit 200 contains a magnetic reading and writing head (not shown) for each track on the magnetic recording disk. In this manner any one of the tracks may be selected for reading and writing at a high speed. FIG. 3 is a sketch illustrating the format of the three instructions. The "primary instructions" are used by the program analyzer to form the disk file instructions and the data processor instructions.

The primary instruction has five parts. These parts are an operator (OP) and four different addresses of four locations in the disk storage unit 200. The four addresses are: the address of an A operand, the address of a B operand, the address where a result is to be stored, and the address where the next primary instruction will be found. Each of the four addresses is divided into two parts. One part identifies the track on a disk (TR) and the second part identifies an angular position on the disk (AP). The primary instruction operator (OP) identifies the operation which is to be performed by the data processor 100 on the information contained at the A operand address and the B operand address. Actually the operands at the A address and the B address on disk are transferred to the working memory 102 of the data processor 100 for execution by the data processor in accordance with the operator. The result of the arithmetic operation is sent back by the data processor to the disk storage unit 200 for storage at the result location identified in the primary instruction. The next primary instruction address identifies where the next primary instruction is to be obtained from the disk.

The "disk file instruction" is the most important instruction to be considered in connection with the present invention. It is the one stored in the distributor memory system 400 and used to control the operation of the disk storage system. The disk file instruction contains four different parts. These parts are: an operator (OP), a track number (TR), and a working memory address. The disk file instructions may also have a queue (not shown) which identifies the head and tail addresses of a queue of instructions in the working memory 102 waiting to be executed. The details of the use of the queue is described in the above referenced copending patent application entitled, "Multi-Program Data Processor."

The disk file instruction operator (OP) is one of three types and identifies one of three different operations. The first type operator is identified as a "fetch" operator. The fetch operator indicates that information is to be removed from the disk storage unit 200 and sent to the program analyzer 500. The fetch operator is used for obtaining primary instructions from the disk storage unit 200 for the program analyzer. The second type of disk file instruction operator is a "store" operator. The store operator causes information from the working memory 102 to be stored into the disk storage unit 200. The third type of disk file instruction operator is a "data" operator. A data operator causes information to be removed from the disk storage unit 200, and sent to the working memory 102 for storage.

The "data processor instructions" are used only by the data processor 100 to control its internal operation. The data processor instructions have six different parts. These parts are: an operator (OP), an A operand address, a B operand address, a disk result address, a next primary instruction address, and a number digit. The data processor instruction may also have a queue (not shown) consisting of a head and tail address. The use of the queue in the data processor instruction is also described in the above referenced copending patent application entitled "Multi-Process Data Processor." The data processor itself only utilizes the operator (OP) and A and B operand addresses and for this reason may be considered a two-address machine. The remainder of the data processor instruction is not utilized by the data processor and are stored in the working memory. To be explained in detail, the disk result address of a primary instruction is used by the program analyzer to form a disk file instruction which causes a result of an arithmetic operation to be stored back into the disk storage unit 200. The next instruction address is used to obtain the next primary instruction from the disk storage unit 200. The number digit is a special purpose digit which is used by the data processor to keep track of whether information has been obtained from the disk storage unit 200.

In the data processor instructions, the A and B operand addresses are addresses of the working memory 102 where the A and B operand data can be obtained for processing. The operator (OP) identifies the operation to be performed on the operands.

Consider the disk electronic and control unit 300. The disk electronic and control unit 300 contains a head selection circuit 302. The head selection circuit may be any one of a number of well known circuits for selecting any one of the read and write heads for reading and writing. The head selection circuit 302 is controlled by a conventional read and write control circuit 304 and information in the information register 402 of the distributor memory system 400. Section **402*b* of the information register 402 determines the particular read/write head which is selected by the head selection circuit 302 and the read/write control circuit 304 causes either a read operation or a write operation in the selected head. The read/write control circuit is controlled by information in section 402*a* of the information register 402. To be explained in more detail, an operator and a track number of a disk file instruction are stored in sections 402*a* and 402*b*** of the information register.

A conventional angular position counter 306 is coupled to the disk storage unit 200 and provides output signals identifying the position of the disk as it rotates in the disk storage unit 200. The angular position counter 306 has *n* different counts and provides a unique output signal corresponding to each of the *n* different sectors on the disk. It is important to note that the angular position counter 306 forms an address for a particular sector in advance of and shortly before the sector becomes available for addressing. In this manner, an instruction can be read from the distributor memory and have it ready for use when the sector actually comes under the reading and writing heads. Although an angular position counter is described by way of example, it will be apparent that other well known circuits may be used for providing signals indicative of the angular position of the disk as it rotates.

Consider now the distributor memory system 400. The distributor memory system 400 contains a distributor memory 404. The distributor memory 404 has *n* different storage locations corresponding to the *n* different sectors on the disk. To be explained in more detail, the disk file instructions are stored in the storage locations of the distributor memory 404, one instruction being stored in each location. Each instruction is stored in the particular storage location corresponding to the angular position of the disk with which it is associated. The output of the distributor memory 404 is coupled to the information register 402. All information being stored into and read out of the distributor memory 404 is stored in the information register 402.

A gate 406 couples the output of the angular position counter 306 to the distributor memory 404. The angular position counter 306 addresses the memory locations in the distributor memory 404 corresponding to each angular position of the disk causing the contents thereof to be read out in synchronism with the rotation of the disk.

A random access address register 408 is also used for addressing the distributor memory 404. The gate 410 couples the output of the random access address register 408 to the memory 404. The read only address register is used for addressing the distributor memory 404 for storing disk file instructions therein. The distributor memory 404 may be a conventional magnetic core memory in which information is read out and stored via the information register 402 in parallel. However, the invention is not limited thereto and the memory may be any one of a number of other well known memory devices.

A control unit 412 is provided for applying read and write control signals to the distributor memory 404 and for controlling the operation of the gates 406 and 410. Gates 414 and 416 are coupled between the output of the information register 402 and input circuits of the data processor 100. To be explained in more detail, the gates 414 and 416 couple addresses contained in disk file instructions which are stored in the information register 402 to the data processor 100 under control of a disk file operator in the section **402*a*** of the information register.

Consider an actual example of the instructions used in the system shown in FIG. 1. Assume that the first primary instruction of a program is stored at track 0 angular position 67. Also assume that the primary instruction word contained at track 0 angular position 67 is as shown in Table I:

TABLE I—EXAMPLE OF PRIMARY INSTRUCTION

Primary instruction:

ADD; 37, 576; 49, 789; 29, 340; 32, 468

The primary instruction says to add the content of track 37 angular position 576 to the content of track 49 angular position 789 and store the result back into track 29 angular position 340. Then get the next primary instruction from track 32, angular position 468, for execution.

The program analyzer 500 will convert the primary instruction of Table I into four different disk file instructions as shown in Table II:

TABLE II

| Disk File Instructions | Action |
|---|---|
| (a) Data; 37; xxx; yyy at AP 576 | Get A operand. |
| (b) Data; 49; zzz; yyy at AP 789 | Get B operand. |
| (c) Store; 29; xxx; — at AP 340 | Store result. |
| (d) Fetch; 32; —; — at AP 468 | Get next primary instruction. |

The symbols "xxx," "yyy" and "zzz" are representative of three different addresses in working memory 102. The "—" symbols in Table II represents the absence of information. Disk File Instruction (a) above says that data is to be obtained at track 37 angular position 576 and stored at address xxx in the working memory 102 and that the data processor instruction from which the data is to be obtained is stored at working memory location yyy.

Disk File Instruction (b) says that data is to be obtained from track 49 angular position 789 of the disk storage unit 200 and stored at the working memory address zzz. As for the disk file instruction (a), address yyy identifies the corresponding data processor instruction.

Thus, disk file instructions (a) and (b) are the instructions for obtaining the A and B operands from the disk storage unit 200 for storage in the working memory 102.

Disk File Instruction (c) of Table II says that a result obtained by the data processor 100 in processing the A and B operands is to be stored at track 29 angular position 340 and that such result can be obtained from working memory address xxx. The data processor 100 processes the two operands by obtaining them from addresses xxx and zzz and stores the result back into the working memory location xxx.

The Disk File Instruction (d) of Table II says that a new primary instruction is to be obtained from track 32 angular position 468 for conversion by the program analyzer in a similar manner to the primary instruction shown in Table I.

The program analyzer 500 also converts the primary instruction of Table I into a data processor instruction which appears in Table III:

TABLE III

Data processor instruction:

ADD; xxx; zzz; 29, 340; 32, 468

The data processor instruction of Table III says that the A operand which is obtained from the disk storage unit 200 and is stored at working memory address xxx and the B operand obtained from disk storage unit 200 and stored at working memory address zzz are to be added and the result stored back into working memory address xxx. The disk storage result address 29, 340, and the disk storage next instruction address 32, 468, are carried along with the instruction in the data processor 100 but are not used by the data processor during execution of the instruction. Thus, it will be evident that the data processor 100 may be a conventional type of 2-address computer which executes instructions having two addresses of two operands and the result of the operation is stored back into the address of the A operand.

Consider the operation of the system shown in FIG. 1 and, in particular, the operation of the distributor memory system 400. Assume that the primary instruction shown in Table I is the first instruction to be executed and that it is stored at track 0 angular position 67.

The data processor 100 stores address 67 via data lines 106 into the random access address register 408. Also, at the same time, the data processor 100 stores the following disk file instruction into the information register 402:

fetch; 00; —; —

The data processor 100 applies a control signal to the control unit 412 via the control line 104. The control unit 412 then causes the gate 410 to couple the random access address register 408 to the distributor memory 404 and activates the distributor memory 404. The address 067 in register 408 causes the disk file instruction □ fetch; 00; —; — □ to be stored immediately into the distributor memory 404 at storage location 067.

The disk storage unit 200 is in continual operation and the disk is rotating causing the angular position counter 306 to apply a sequence of address signals to the gate 406. After the instruction is stored in the distributor memory 404, the control unit 412 causes the gate 406 to couple the angular position counter 306 to the distributor memory 404 and, with each new address signal from the angular position counter 306, the control unit 412 causes the distributor memory 404 to read out the content of the corresponding storage location.

Assume now that the disk is about ready to have sector 067 read and that the angular position counter 306 forms the address 067. The disk file instruction □ fetch; 00; —; — □ is read out and stored in the information register 402. At this time section 402*a* contains the "fetch" operator and the section 402*b* contains the track number 00. The read/write control 304 is responsive to the fetch operator for causing the head selection circuit 302 to read out the content of track 00. Since the disk instruction operator is a fetch, the gate 314 couples the signals being read out through the head selection circuit 302 to the primary instruction lines 308 causing the primary instruction contained in track 00 angular position 67 to be stored in the program analyzer 500.

The distributor memory system 400 and the disk systems 200 and 302 continue their operation and as each new count of the angular position counter 306 appears, the distributor memory 404 reads out the disk file instruction contained in the corresponding stored location and stores it in the information register 402 for execution.

Subsequently, the program analyzer 500 forms the disk file instruction □ 37; xxx; yyy □ shown in Table II. At this time, the program analyzer 500 stores angular position number 576 into the random access address register 408 via the address lines 504 and the disk file instruction is stored into the information register 402. The control unit 412 then causes the instruction to be stored at address 576 in a similar manner to that described above. After the instruction is stored, the gate 406 couples the angular position counter 306 back to the distributor memory 404 and the system continues its operation.

When address 576 appears in the angular position counter 306 the disk is properly positioned to begin an access to sector 576 and subsequently the disk file instruction □ data; 37; xxx; yyy □ appears in the information register 402. Since the operator is a data operator, it specifies that data is to be obtained from track 37 and stored in the working memory 102 at address xxx. To this end, the read/write control 304 causes the head selection circuit to read out the content of track 37 and the gate 314 couples the data read from this location back to the information register 102*a* of the working memory 102. Additionally, the gate 414 controlled by the data operator stores the address xxx into the address register 102*b* of the working memory 102. The gate 416 is also responsive to the data operator to couple the address yyy back to another register (not shown) of the data processor 100. The address xxx contained in the address register 102*b* causes the operand contained in the information register 102*a* to be stored at address xxx for subsequent use by the corresponding data processor instruction.

Although it is not of importance to an understanding of the present invention, the data processor 100 uses the address yyy to determine whether or not the corresponding data processor instruction has been stored at yyy. If the data processor instruction has already been stored at yyy, then the digit number at the end of the data processor instruction (see FIG. 3) would be counted down one to reflect the fact that one of the operands for the particular instruction had been obtained from the disk storage unit 200.

The program analyzer 500 now forms the B operand The store instruction is □ store; 29; xxx; — □ shown at of Table II. The B operand disk file instruction is stored in the distributor memory 404, similar to that described for the A operand disk file instruction, except that it is stored at storage location 789. Similar to that described above, the B operand contained at track 49 angular position 789 is subsequently read out and stored into the working memory 102*a*. However, the B operand is stored at memory location zzz, rather than xxx. Again, the data processor 100 receives the address yyy from the disk file instruction and the data processor determines whether the data processor instruction has been stored into the data processor 100. If it has, then the instruction will be executed.

Consider now how the data processor instruction shown in Table III is used, once it has been formed by the program analyzer 500. After the data processor instruction is formed, it is stored into the information register 102*a* of the working memory by the program analyzer 500 via the instruction lines 510. At the same time the program analyzer 500 stores the address yyy into the address register 102_b_ via the address lines 508. The data processor 100 is then operative for storing the data processor instruction into the working memory at the address yyy.

The data processor then proceeds to execute the data processor instruction taking the A operand at address xxx and adding it to the B operand at the address yyy. The result of the arithmetic operation is then stored back into the working memory address xxx.

After the data processor instruction has been executed, the data processor instruction is sent back to the program analyzer 500 via the instruction lines 510. The program analyzer then forms the store disk file instruction. The store instruction is □ store; 29; xxx; — □ shown at (c) of Table II. This instruction is stored at storage location 340 of the distributor memory 404. Assume now that the disk in the disk storage unit has rotated to the position wherein the angular position counter addresses location 340 and the disk file instruction shown at (c) of Table II is contained in the information register 402. A store operator is contained at 402_a_ of the information register 402. The store operator says that information contained at working memory address xxx is to be read out and written in the disk storage unit in track 29 angular position 340. To this end, the gate 414 causes the address xxx contained at 402_c_ of the information register 402 to be stored in the address register 102_b_ of the working memory. The data processor 100 reads the content of location xxx and stores it into the information register 102_a_. The read/write control 304 is responsive to the store operator contained at 402_a_ of the information register 402 to cause the result, now contained in the information register 102_a_, to be written in track 29 at angular position 340.

The program analyzer 500 then forms the fetch instruction □ fetch; 32; —; — □ shown at (d) of Table II. The fetch instruction is stored at storage location 468 of the distributor memory 404, similar to that described hereinabove, and is subsequently read out, stored in the information register 402, and used to obtain the next primary instruction from track 32 angular position 468. The operation then continues similar to that described above.

It should be noted that in the preceding discussion it would appear as if the disk file instructions are formed, stored in the distributor memory 400 and subsequently read out for execution before the next disk file instruction is stored in the distributor memory. The description is given in this manner for ease of description of the operation of the system. Actually, the program analyzer 500 forms many disk file instructions in a short period of time compared with the time for one revolution of the disk. As a result, most, if not all, of the distributor memory locations are filled with disk file instructions at the same time. The distributor memory locations are read out, one at a time, as the corresponding sector becomes available for accessing.

Figure 4:
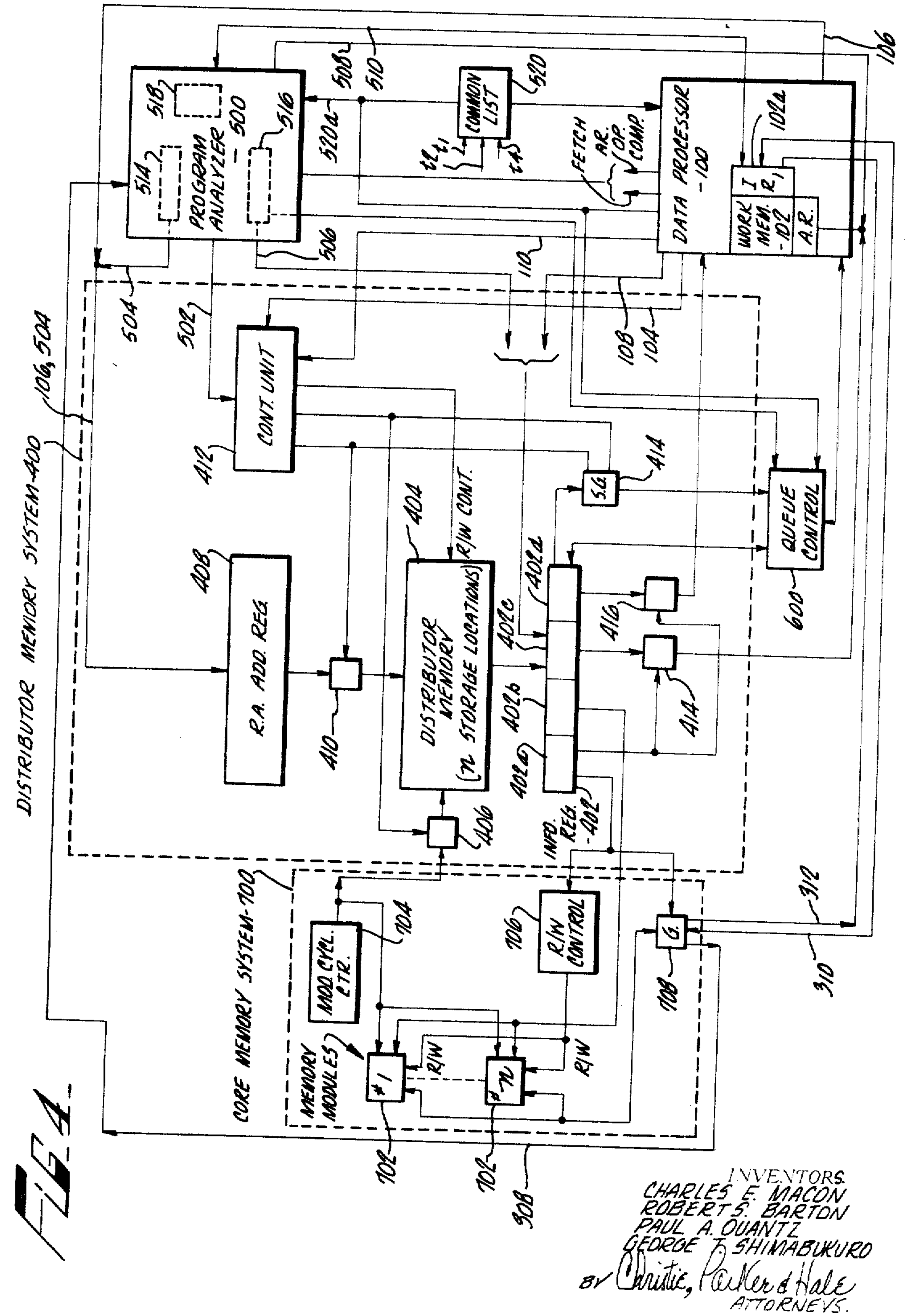
FIG. 4 is a block diagram of another data processing system and embodies the present invention.

FIG. 4 shows an alternate embodiment of the invention. The system is basically the same as that shown in FIG. 1 except that the disk storage unit 200 and the disk electronic and control unit 300 are replaced by a magnetic core memory system 700.

The memory system 700 has one through _n_ memory modules 702 which are conventional magnetic core memory modules each having its own timing, read and write circuitry, address register and information register which are normally found in a magnetic core memory module.

A module cycle counter 704 provides a unique count for each of the different memory modules. The output of the module cycle counter 704 is coupled to each memory module and each time the module cycle counter is in a state corresponding to one of the memory modules, the corresponding memory module is responsive thereto to start a memory cycle whereon either a read or a write operation takes place. A read and write control circuit 706 applies a control signal to each memory module and thereby determines whether a read or a write operation takes place in the selected memory module. The read and write control circuit 706 corresponds to the read and write control circuit of FIG. 1 and is coupled to the section 402_a_ of the distributor information register 402 where an instruction operator is stored.

The instructions for the memory modules are essentially the same as the disk file instructions. Each has an operator to specify a fetch, a data read or date store, the same as a disk file instruction. However, each has an address of a memory location in a memory module in place of the angular position number. The instructions are stored in the distributor memory 404 with the address portion stored in section 402_b_ of the information register 402 when the instruction is read in the distributor memory 404. The output of section 402_b_ is connected to each of the memory modules.

A gate 708 is coupled between the memory modules and the data processor 100 and the program analyzer 500. The gate 708 couples the outputs of the memory modules either to the program analyzer 500 or to the data processor 100 or couples the data processor 100 to the memory modules. The gate 708 is controlled by the operator stored in section 402_a_ of the information register.

In operation the module cycle counter 704 is a free running counter that counts from one memory module to the next and for each state causes the distributor memory 404 to read out an instruction from the corresponding storage location. Each instruction is stored into the information register 402. The operator of each instruction causes the read and write control circuit 706 to initiate a read or a write operation in the memory module selected by the module cycle counter 704. The memory module which is selected by the module cycle counter 704 reads or writes under control of the read and write control circuit 706. If the operator in 402_a_ is a fetch operator, a read operation takes place and the data read out of the addressed memory location of the memory module is coupled by the gate 708 to the circuit 308 back to the program analyzer 500. If the operator is a data operator, a read operation takes place in the addressed location of the memory module and the contents are read out and coupled by the gate 708 to the circuit 312 back to the data processor 100. If the operator is a store operator, a write operation takes place in the addressed location of the memory module and data is stored from the information register 102_a_ into the addressed memory location of the designated memory module.

This organization is quite important because in magnetic core memory modules time is required for a complete read and write cycle. Therefore, it is not possible to initiate a memory read or write cycle and then initiate another cycle again immediately. With the organization shown in FIG. 4, it is possible to initiate a read or write operation in one memory module and then initiate a read and write operation in each of the other memory modules in sequence. By the time the module cycle counter 704 gets back to the first memory module, its read and write operation is complete and ready to be initiated for another read or write operation.

It will also be apparent that the most efficient use of the memory module system is accomplished by use of the distributor memory system. In the distributor memory system there is a memory location for each memory module, each memory module being a group of storage locations. The memory modules become available for accessing one at a time cyclically as each is initiated by the module cycle counter. Therefore, the instructions corresponding to each memory module is read out as the corresponding memory module becomes available for accessing.

Although one preferred embodiment of the invention and an alternate has been shown by way of example to illustrate the present invention, it should be understood that many rearrangements and modifications are possible within the scope of the present invention as defined in the following claims. For example, to take care of the situation where it is desired for the program analyzer to put a disk file instruction in a distributor memory location where another disk file instruction is stored, a storage queue may be added and the disk file instruction stored in the queue and stored into the distributor memory, one at a time, in a selected sequence.

What is claimed is:

1. Storage apparatus the combination comprising cyclical storage means having cyclically accessible storage positions therein including controllable means for reading and writing therein in response to instructions, addressing means for forming a unique address for each different storage position as it becomes available for accessing, memory means having a memory location for each storage position of said cyclical storage means, each memory location for storing an instruction identifying a read or a write operation, said memory means being coupled to said addressing means and including means for reading out the instruction contained in each memory location as the corresponding address is formed and means for coupling such instructions to the controllable means causing either a read or a write operation, in accordance with the applied instruction, at each storage position for which there is an instruction in the corresponding memory location.

2. Storage apparatus as defined in claim 1 wherein said memory means comprises an instruction storage register for storing each instruction, one by one, as read out of said memory means for use in controlling said storage means.

3. Storage apparatus as defined in claim 1 wherein said memory means comprises an address register and an information register into which instructions are placed for storage in the cyclical storage means and means for causing said memory means to store an instruction into the memory location of the memory means specified by an address contained in said address register.

4. Storage apparatus the combination comprising disk storage means having a disk with a plurality of tracks of storage divided into angular storage positions and including a transducing head for each said tracks, an angular position indicating means coupled to said disk storage means, electronic and control means coupled to said disk storage means for reading and writing through said transducing heads under control of an instruction, distributor memory means having a memory location for each of said angular storage positions for storing an instruction designating either a read or a write operation, said distributor memory means being coupled to said indicating means and operative for selectively reading out the instruction corresponding to each angular position as it is indicated and means for coupling the instruction to said electronic and control means for control of reading and writing, in accordance with the applied instruction, in each angular position for which there is an instruction in the corresponding memory location of the memory means.

5. Apparatus for addressing a disk storage means having at least one recording disk arranged into a plurality of circular tracks and $n$ sequentially addressable segments and arranged for control of reading and writing therein in response to instructions the combination comprising a counter synchronized with the rotation of the disk to be addressed and providing a different unique output signal in advance of the availability of each segment on such disk, a memory device having a storage location corresponding to each segment of such disk into which an instruction is stored which identifies a track and whether reading or writing is to take place therein, and a storage register coupled to said memory for storing instructions, one by one, as read out of said memory device and for providing such instructions to such disk file storage unit for control of the operation thereof, said memory device being coupled to the counter and including means for reading out the content of the memory device storage location corresponding to each count of said counter in synchronism therewith causing control signals to be applied to the disk storage means for control of reading and writing in each segment as it becomes available.

6. Apparatus as defined in claim 5 including an address register and an information register coupled to said memory, said address register being arranged for storing an address identifying a particular segment on such disk, said information register having an input for receiving an applied instruction for storage in said memory means, said memory means including control means for causing a program word stored in said information register to be stored in a memory location corresponding to the address stored in said address register for subsequent use in controlling such disk storage means.

7. Apparatus for addressing a cyclical storage means having a plurality of storage positions in which information is read and stored under control of instructions, the combination comprising an address forming means for providing a different unique address signal in advance of the availability of each storage position of such cyclical storage means, memory means having a memory storage location corresponding to each storage position of such cyclical storage means into which an instruction is stored, and a storage register coupled to said memory means for storing instructions read out of said memory device and means for coupling the stored instructions to such cyclical storage means for control of the operation thereof, said memory means being coupled to the address forming means and including means for reading out the content of the memory storage location corresponding to each new address in synchronism therewith causing instructions to be applied to such cyclical storage means for control of reading and storing therein as each storage position becomes available.

8. Apparatus as defined in claim 7 including an address register and an information register coupled to said memory means, said address register being arranged for storing addresses identifying a particular storage position in the cyclical storage means, said information register having an input for receiving an applied program word for storage in said memory means, said memory means including control means for causing a program word stored in said information register to be stored in a memory location corresponding to the address stored in said address register for subsequent use in controlling such cyclical storage means.

9. Storage apparatus the combination comprising storage means having a plurality of groups of addressable storage locations, said groups of storage locations becoming available for accessing cyclically, one at a time, said storage means comprising means for forming a signal identifying each group of storage locations as it becomes available for accessing and being operative in response to an instruction which designates an address and either a read or a write operation for either reading or writing in a particular storage location, memory means having a memory location corresponding to each group of storage locations for storing one of said instructions, said memory means being coupled to said signal forming means and responsive thereto for reading out the instruction in each memory location in synchronism with the accessibility of the corresponding groups of storage locations and means for applying each of said instructions to said storage means causing reading or writing in the identified storage location of the accessible group of storage locations.

10. Storage apparatus as defined in claim 9 wherein each of said groups of addressable storage locations comprises a separate memory module.

11. Storage apparatus as defined in claim 10 wherein said signal forming means comprises a counter for providing a unique count for each memory module and is coupled to each memory module for causing a reading or writing operation to be initiated in each memory module in response to the corresponding count as designated by an applied instruction.

12. Storage apparatus according to claim 1 wherein said instructions include a read or a write designation for said cyclical storage means.

13. Storage apparatus according to claim 12 including control means for selectively causing reading and writing in the cyclical storage means in accordance with the read or write designation of an instruction coupled to the cyclical storage means.

14. Storage apparatus according to claim 1 including at least two information paths coupled to said cyclical storage means for information to be read and written therein, said instructions including a designation of one of said paths for such information.

15. Storage apparatus according to claim 14 including gating means for coupling the cyclical storage means to the information path designated by an instruction coupled to said cyclical storage means.

16. Storage apparatus according to claim 1 including at least one information path from said memory means to another device, and means for coupling a portion of the instruction read out to said memory means to said information path for such other device.

17. Storage apparatus according to claim 1 wherein said instructions include a control signal for said information path coupling means, said information path coupling means being selectively operative in response to said control signal for coupling a portion of an instruction read from said memory means to said information path.

References Cited

UNITED STATES PATENTS

| | | | |
|---|---|---|---|
| 3,289,174 | 11/1966 | Brown et al. | 340—172.5 |
| 3,332,070 | 7/1967 | Lucas et al. | 340—172.5 |
| 3,341,817 | 9/1967 | Smeltzer | 340—172.5 |
| 3,348,213 | 10/1967 | Evans | 340—172.5 |
| 3,350,694 | 10/1967 | Kusnick et al. | 340—172.5 |
| 3,351,914 | 11/1967 | Stone | 340—172.5 |

RAULFE B. ZACHE, Primary Examiner

PO-1050
(5/69)

UNITED STATES PATENT OFFICE
CERTIFICATE OF CORRECTION

Patent No. 3,490,006 Dated January 13, 1970

Inventor(s) C.E. MACON ET AL

It is certified that error appears in the above-identified patent and that said Letters Patent are hereby corrected as shown below:

Col. 8, line 56, should be deleted and read as follows:

--disk file instruction ☐ data; 49; zzz; yyy ☐ shown at b)--

SIGNED AND
SEALED
JUN 23 1970

(SEAL)
Attest:

Edward M. Fletcher, Jr.
Attesting Officer

WILLIAM E. SCHUYLER, JR.
Commissioner of Patents